(12) United States Patent
Kato et al.

(10) Patent No.: US 6,789,008 B2
(45) Date of Patent: Sep. 7, 2004

(54) VEHICLE CONTROL DEVICE WITH POWER STEERING DEVICE

(75) Inventors: Hiroaki Kato, Nukata-gun (JP); Minekazu Momiyama, Chiryu (JP); Yoshiyuki Yasui, Nagoya (JP); Wataru Tanaka, Anjo (JP); Kenji Asano, Toyota (JP); Eiichi Ono, Toyota (JP); Yuji Muragishi, Nagoya (JP)

(73) Assignees: Toyoda Koki Kabushiki Kaisha, Kariya (JP); Advics Co., Ltd., Kariya (JP)

( * ) Notice: Subject to any disclaimer, the term of this patent is extended or adjusted under 35 U.S.C. 154(b) by 21 days.

(21) Appl. No.: 10/400,623

(22) Filed: Mar. 28, 2003

(65) Prior Publication Data

US 2003/0213640 A1 Nov. 20, 2003

(30) Foreign Application Priority Data

Mar. 29, 2002 (JP) ........................... 2002-096620
Mar. 29, 2002 (JP) ........................... 2002-096621

(51) Int. Cl.$^7$ ................................................ G06F 7/00
(52) U.S. Cl. ..................... 701/41; 180/443; 180/446
(58) Field of Search ................ 701/41–44; 180/443, 180/446

(56) References Cited

U.S. PATENT DOCUMENTS 6,041,884 A * 3/2000 Shimizu et al. ............. 180/443
6,148,951 A * 11/2000 Nishi et al. .................. 180/446
6,154,696 A * 11/2000 Nishi et al. .................... 701/41
6,272,403 B2 * 8/2001 Sugitani et al. ................ 701/1

FOREIGN PATENT DOCUMENTS

| JP | 03-053143 | 8/1991 |
| JP | 11-049003 | 2/1999 |
| JP | 2002-087300 | 3/2002 |

OTHER PUBLICATIONS

M. Abe, Sankaidoh, 4$^{th}$ Edition, cover page and pp. 122–125, "Motion and Control for Vehicles", Apr. 15, 2001.

* cited by examiner

Primary Examiner—Gertrude A. Jeanglaude
(74) Attorney, Agent, or Firm—Oblon, Spivak, McClelland, Maier & Neustadt, P.C.

(57) ABSTRACT

A vehicle control device incorporating an electric power steering is provided, wherein an extraordinary yaw motion acting on a vehicle is detected and is suppressed or moderated, so that the stability of the vehicle in a straight-ahead steering is improved. The causes of the extraordinary yaw motion are one of lateral wind, asymmetrical surface state of the road, lateral slant of the road and the like. A countermeasure against the extraordinary yaw motion is taken by applying a counter (opposite direction) yaw motion on the vehicle or switching over the control mode from a proportional control to a proportional integral control.

12 Claims, 10 Drawing Sheets

VEHICLE CONTROL DEVICE WITH POWER STEERING DEVICE

INCORPORATION BY REFERENCE

This application is based on and claims priority under 35 U.S.C. sctn. 119 with respect to Japanese Applications No. 2002-096620 and No. 2002-096621 both filed on Mar. 29, 2002 the entire contents of which are incorporated herein by reference.

BACKGROUND OF THE INVENTION

1. Field of the Invention

The present invention relates to a vehicle control device incorporating an electric power steering device with an electric motor for generating an assist force when a steering wheel is manipulated by the driver. More particularly, it relates to a vehicle control device with the power steering device for automatically suppressing or moderating a yaw motion acting on a vehicle.

2. Discussion of the Related Art

Figure 10:
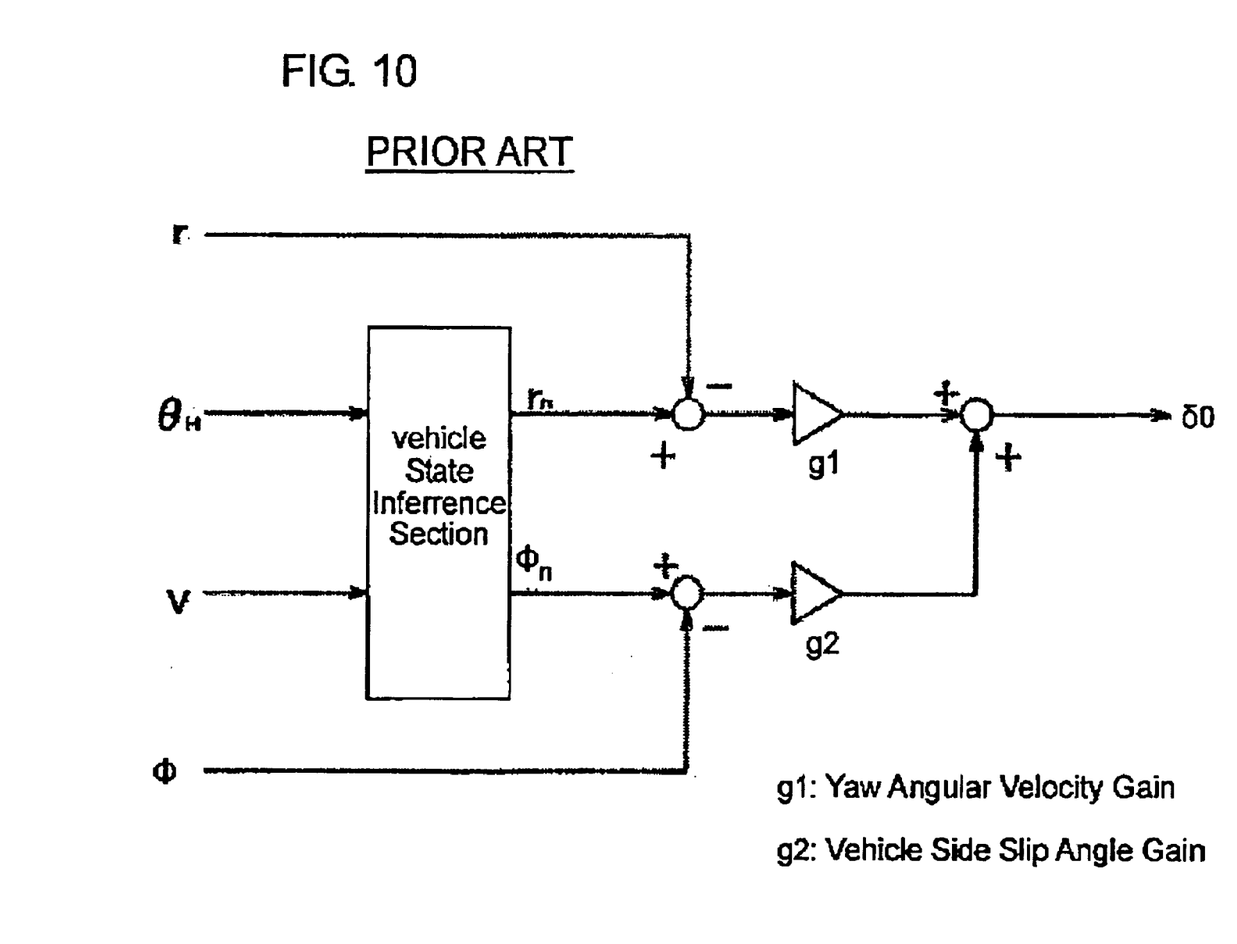
FIG. 10 is a control block diagram showing the operation execution procedure for calculating an actuator command angle $\delta 0$ in prior art.

FIG. 10 exemplifies a control block diagram of a prior art operation processing procedure for an ACT (actuator) command angle ($\delta 1$). The ACT command angle ($\delta 1$) has been used as a compensation amount for the real steering angle of front wheels for the purpose of automatically suppressing or moderating a yaw angular motion which is caused by a disturbance.

A vehicle state inference section infers a target value ($r_n$) of a vehicle yaw angular velocity (r) and a target value ($\alpha_n$) of a vehicle side slip angle ($\alpha$) based on a measured steering angle ($\theta_H$) and a measured vehicle speed (V) of the vehicle. The yaw angular velocity (r) and the side slip angle ($\alpha$) of the vehicle are further measured and the aforementioned ACT command angle is calculated based on the following equation (1). Thus, as a result of the real steering angle ($\delta$) of the front wheels being adjusted automatically, the yaw angular motion which is caused by a disturbance is relieved, to some extent, of the part exceeding the level to be suppressed.

$$\delta 1 = g1(r_n - r) + g2(\alpha_n - \alpha) \tag{1}$$

The equation above is high in applicability and has a relatively wide range of application. However, it was found by our experiment that as long as the equation (1) is used under an unusual situation, the yaw angle motion of a magnitude which exceeds a critical level at the occurrence of a disturbance cannot be necessarily suppressed to a satisfactory level.

Especially, in applying the equation (1) in the case of straight-ahead running at high speeds, the accuracy in calculation is low with the compensation amount constituting an ACT (actuator) command angle ($\delta 1$). Thus, where the foregoing prior art method is employed in calculating the compensation amount on the basis of the foregoing equation (1), it was not easy to satisfactorily realize the vehicle motion performance having a rigid straight-ahead stability.

Further, in the prior art, the feedback control of the yaw angular velocity (r) is executed in a well-known proportional control method.

In the present sensing technology, it is not easy to calculate the aforementioned difference ($\Delta r = r_n - r$) satisfactorily precisely. This gives rise to problems in the following respects.

(Problem 1) Since the aforementioned difference ($\Delta r$) involves an error, it may occur that if the gain (g1) of the above equation (1) is increased, an unpleasant feeling such as vibration, an unusual or strange steering feeling or the like is given to the driver. This makes it difficult to increase the gain (g1) as much large as needed.

In addition, if the control mode of executing the feedback control of the yaw angular velocity (r) is altered from a proportional control to a conventional proportional integral control, a further problem occurs in the following respect.

(Problem 2) It may occur that the time-integration of the difference ($\Delta r$) invites cumulating the above error thereby to lower the calculation result in accuracy. As a consequence, it may further occur that the driver is given a steering feeling accompanied by an unusual or strange feeling. Moreover, the error in the time-integration may be enlarged as time goes. Therefore, a favorable result is quite difficult to realize only by altering the control mode from the proportional control to a conventional proportional integral control.

For the reason that the foregoing problems and in particular, the problem 2 are not easy to solve, the proportional control mode has heretofore been employed with respect to the yaw angular velocity (r).

For example, when braking is applied with a vehicle traveling on a asymmetrical surface road having an asymmetrical surface state, the difference ($\Delta r$) or the difference ($\alpha_n - \alpha$) increases. If an attempt is made to execute the vehicle control depending on the above equation (1) under the circumstance as mentioned above, the vehicle would try to follow a target line of traveling as it makes a large vibration. In this event, the driver tries to keep the vehicle in parallel to the asymmetrical surface road by holding the neutral steering position or by performing a counter steering against the yawing. However, the steering optimum to the circumstance is not easy to perform, and therefore, it comes often to the case that the vehicle makes a large angle with respect to the traveling road.

SUMMARY OF THE INVENTION

It is therefore a primary object of the present invention to provide an improved vehicle control device capable of realizing a vehicle motion performance which is rigid or stiff in a straight-ahead stability and is sufficiently stable.

Another object of the present invention is to provide an improved vehicle control device capable of being rigid or stiff against a yaw motion acting on a vehicle.

A further object of the present invention is to provide an improved vehicle control device capable of suppressing or moderating a yaw motion acting on a vehicle within a short period of time.

A still further object of the present invention is to provide an improved vehicle control device capable of enhancing the traveling stability of a vehicle on a road having an asymmetrical surface state.

Briefly, according to the present invention, there is provided a vehicle control device including a power steering device which provides an assist torque or a steering angle command to a steering mechanism of a vehicle, the control device comprising: compensation steering angle operation means for calculating a compensation steering angle relative to a real steering angle of the steering mechanism; extraordinary yaw motion detecting means for detecting the occurrence of an extraordinary yaw motion which is not caused by the steering manipulation of the driver; compensation steering angle altering means for altering the compensation steering angle to suppress the extraordinary yaw motion; and real steering angle control means for controlling the compensation steering angle by using the compensation steering angle altering means when the occurrence of the extraordinary yaw motion is detected by the extraordinary yaw motion detecting means.

With this configuration, when the occurrence of the extraordinary yaw motion is detected, the compensation steering angle is altered to suppress or make relief of the extraordinary yaw motion, so that the straight-ahead stability of the vehicle can be improved.

In another aspect of the present invention, as defined in claim 2, the extraordinary yaw motion detecting means includes straight-ahead steering judging means for making judgment as to whether or not the driver is steering the vehicle to travel straight ahead, and the extraordinary yaw motion detecting means detects the occurrence of the extraordinary yaw motion not caused by the steering manipulation of the driver when he or she is manipulating the straight-ahead steering.

With this configuration, the yaw motion caused by a disturbance is distinguished from that intentionally caused by the driver, and the vehicle control is performed depending on the distinction. Therefore, the straight-ahead stability can be secured while the maneuvering in a sports-like driving can also be maintained at the same time.

In another aspect of the present invention, as defined in claim 3, the device further comprises object detecting means for detecting an obstacle or a moving object existing around the vehicle, and first compensation canceling means for canceling the compensation operation by either causing the compensation steering angle operation means not to operate or making the compensation steering angle zero when the obstacle or the moving object is detected by object detecting means.

With this configuration, when an obstacle or a moving object existing around the vehicle is detected, the compensation steering angle operation is substantially cancelled, so that the driver is able to maneuver the vehicle to cope with an emergency situation.

In a further object of the present invention, as defined in claim 6, the device is constructed such that the extraordinary yaw motion detecting means detects the extraordinary yaw motion occurring when the vehicle is braked on a road which is asymmetrical with respect to the right and left surface states thereof.

With this configuration, the vehicle control device is given a capability of detecting whether or not brake is applied on the vehicle traveling on a road having an asymmetrical character of the surface state. Thus, the vehicle control device is able to make the vehicle adapted to such a road.

BRIEF DESCRIPTION OF THE ACCOMPANYING DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

DETAILED DESCRIPTION OF THE PREFERRED EMBODIMENTS (First Embodiment)

Prior to describing a first embodiment in detail, the general concept thereof is described for better understanding. Specifically, the first embodiment in one preferred form is directed to a vehicle control device having yaw motion detecting means for detecting a vehicle yaw motion by detecting a yaw angle velocity (r) or a lateral acceleration (a) acting on a vehicle; and a power steering device for imparting an assist torque or a steering command to a steering mechanism of the vehicle. The control device is further provided with straight-ahead judging means for judging whether or not the driver is performing the steering to make the vehicle travel straight ahead (straight-ahead steering); and compensation steering angle calculating means for calculating a compensation angle ($\delta 0$) which acts to suppress or moderate a yaw motion caused by a disturbance occurring when the drive is performing the straight-ahead steering, and outputting the calculated compensation angle ($\delta 0$) to the power steering device.

If the yaw motion acts on the vehicle when the driver is manipulating the straight-ahead steering (neutral position steering), the cause of such a yaw motion must be a disturbance. This conclusion can also be reached from a motion equation relating to the yaw motions of vehicles. Lateral wind can be recited as one example of such disturbances.

On the other hand, it is known that where the radius of a curvature on a yaw motion when the vehicle runs along a regular circle is taken as ($\rho$), the real steering angle of the vehicle is calculated by the following equation (2).

$$\rho = V/r = (1-AV^2)L/\delta \qquad (2)$$

Where: symbols "V", "r" and "$\delta$" represent vehicle speed, yaw angular velocity and real angle of front wheels, respectively. A symbol "L" represents wheelbase of the vehicle. Further, the constant "A" represents a stability factor of the vehicle, which factor is obtained from the following equation (3).

$$A = m(L_r K_r - L_f K_f)/(2L^2 K_r K_f) \qquad (3)$$

(Notation of Constants)

m: vehicle weight $L_f$: distance between vehicle gravity center and front axle $L_r$: distance between vehicle gravity center and rear axle $K_f$: tire cornering power per front wheel $K_r$: tire cornering power per rear wheel The relations between these parameters are described for example in "Motion and Control for Vehicles", Sankaidoh, 4th edition, Apr. 15, 2001.

From the foregoing relations, it can be understood that where a yaw angular velocity (r) caused by a disturbance is detected with the steering being at the straight-ahead steering position (neutral steering position), the yaw angular velocity (r) can be suppressed or relieved of neither too much nor too little by generating a counter yaw angular velocity (−r) based on a real angle (δ0) calculated by the following equation (4) or (5), as is clear from the above equation (2).

$$\delta 0 = L(AV^2 - 1)r/V \quad (4)$$

$$\delta 0 = L(AV^2 - 1)a/V^2 \quad (5)$$

Herein, "$\rho = V^2/a$" is employed. The denominator (a) is the lateral acceleration acting on the vehicle.

That is, when the yaw angular velocity (r) caused by a disturbance occurring during the straight-ahead steering (neutral position steering) is detected, a so-called counter steering which depends on the real steering angle (δ0) calculated by the foregoing equation (4) or (5) is automatically given in place of the compensation amount (δ1) calculated by the foregoing equation (1), whereby the yaw motion of the vehicle can be suppressed.

The straight-ahead steering judging means is constituted as being capable of judging whether or not the straight-ahead steering (neutral position steering) is being performed, based on the steering angle ($\theta_H$), the steering angular velocity ($\omega_H$) or the like. As the physical character for the judgment of the straight-ahead steering, there can be used others such as, for example, the steering torque ($\tau$), the time-differentiated value ($d_\tau/dt$) of the same, or the like.

Further, the judgment of whether or not the driving is performing the steering (straight-ahead steering) to make the vehicle to run straight ahead could be such a probability judgment that is often used in the fuzzy control theory or the like. By utilizing the control method of this kind, it becomes possible or easy to realize a natural steering feeling which is less unpleasant around the straight-ahead steering position.

With the foregoing configuration and operation, there can be realized a vehicle motion performance which is satisfactorily stable with the straight-ahead stability being stiff or rigid. Therefore, according to the aforementioned vehicle control device, the drive is relieved of a high-level or delicate steering operation which is needed when the vehicle suffers the affection of a disturbance such as, for example, lateral wind, laterally slanted road or the like. These operations/effects are particularly effective in the case of the vehicle speed (V) being high.

In addition, those systems to which the first embodiment is applicable could, for example, be a steer-by-wire system, a hybrid system combing an EPS with a VGRS as exemplified later, a conventional electric motor power steering system of a single motor type, and so forth. In particular, in the viewpoint that a power steering device with a more natural steering feeling can be easily constituted, the steer-by-wire system and the hybrid system combing the EPS with the VGRS are more favorable as a system to be selected.

This is because the canceling, lowering and adjusting (tuning) of a strange feeling in the state of the neutral position steering can be relatively easily carried out in the steer-by-wire system and the hybrid system, wherein the steering angle is not directly connected with the real steering angle (i.e., there is not a one-to-one relation), rather than in the conventional electric motor power steering system which is driven and controlled by one electric motor only.

In another or second preferred form, the first embodiment features providing, in the aforementioned preferred form, object detecting means for detecting an obstacle or a moving object being around the vehicle, and first compensation canceling means for canceling the foregoing control operation by suppressing the operation of the compensation steering angle calculation means or making the compensation steering angle (δ0) zero when the obstacle or the moving object is detected.

For example, the object detecting means could be constituted by such a radar or the like that is often used in an active cruse control system.

For example, it may happen that even where a yaw motion occurs due to a disturbance against driver's expectation, the yaw acceleration occurring in the event unexpectedly acts in the direction toward avoiding the collision with an obstacle or a moving object around the vehicle. In this case, therefore, it does not seem necessarily favorable to execute the foregoing compensation control automatically or forcibly.

According to the second preferred form of the first embodiment, such forcible compensation is cancelled when the obstacle or moving object around the vehicle is detected. Thus, driver's avoidance manipulation (i.e., urgent steering) regarding the obstacle or the moving object can be prevented from being impeded by the foregoing compensation operation for suppressing the disturbance.

In still another or third preferred form, the first embodiment features further providing, in the first or second form, lane line identifying means for identifying a lane line of a lane on which the vehicle is traveling, by an image processing technology; lane line crossing inferring mean for inferring whether or not the vehicle crosses the lane line if the compensation steering angle (δ0) were used; and compensation canceling means for canceling the foregoing compensation control by suppressing the operation of the compensation steering angle calculating means or making the compensation steering angle (δ0) zero if crossing the lane line is inferred to occur by the lane line crossing inferring means.

For example, the lane line identifying means may be constituted by an on-vehicle camera such as, for example, a CCD camera which is often used in a lane keeping support system or the like.

For example, in the event that a yaw motion occurs due to a disturbance against driver's expectation, it may happen that the yaw acceleration generated in that event unexpectedly acts in the direction towards keeping or assisting the vehicle to run on almost the center of the traveling lane. In this case, therefore, it does not seem necessarily favorable to execute the foregoing compensation control automatically or forcibly.

In a further or fourth preferred form, the first embodiment features further providing, in any of the first through third preferred forms, alarming means for outputting to the driver a message drawing his or her attention to the disturbance when an absolute value of the compensation steering angle (δ0) or a value related to the absolute value exceeds a predetermined threshold value ($\epsilon$), the value ($\epsilon$) being larger than zero (>0).

It can be expected that when a disturbance to cause a yaw motion occurs during the straight-ahead steering, the driver is ensured to perform a suitable steering like the neutral position steering, so that a more reliable vehicle control can be realized.

Figure 1:
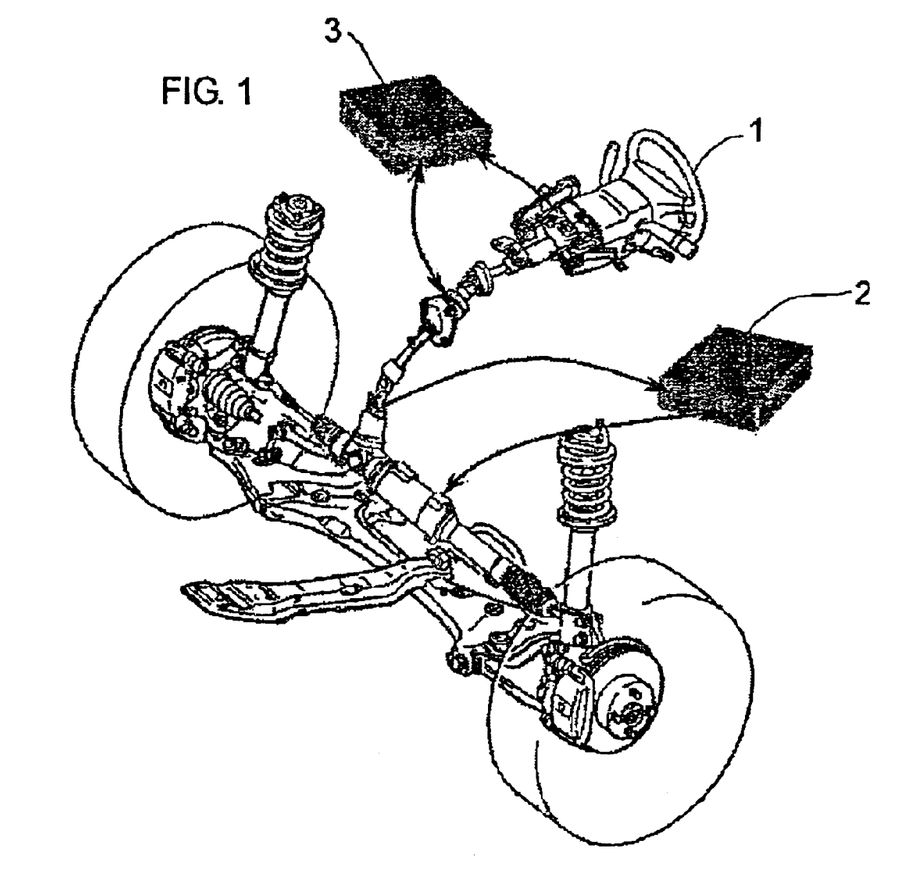
FIG. 1 is a perspective view of an electric power steering device constituting a vehicle control device of a first embodiment according to the present invention.
Figure 2:
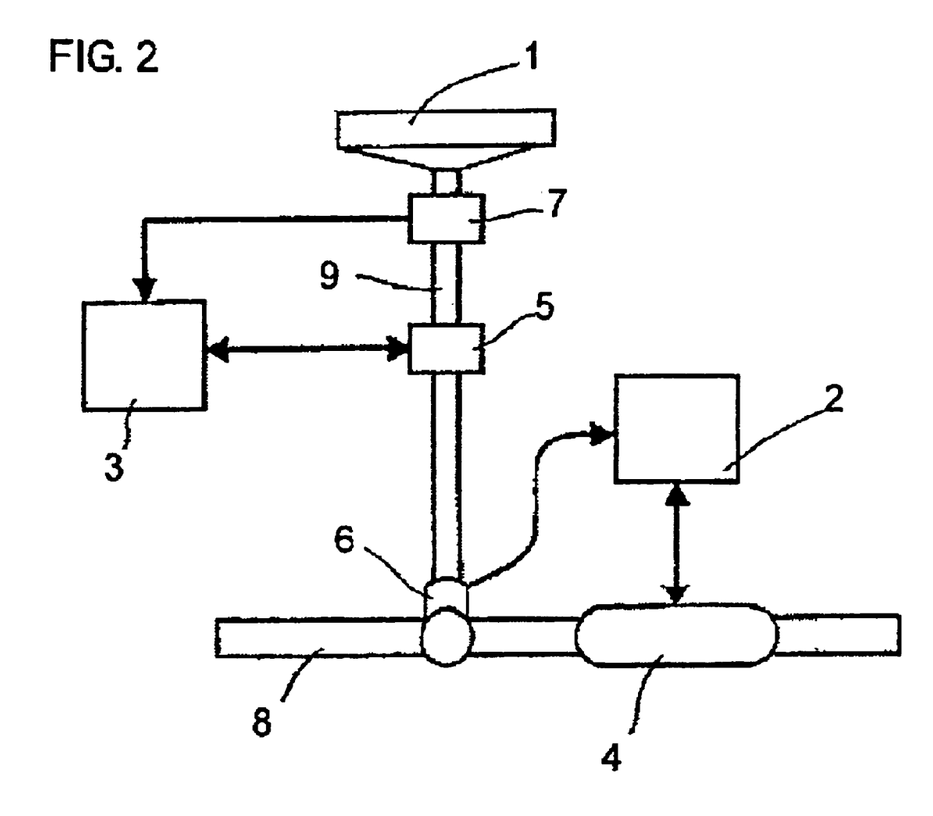
FIG. 2 is an explanatory representation of the electric power steering device shown in FIG. 1.

Referring now to the drawings, and more particularly to FIGS. 1 and 2, there are shown a perspective view and a rough physical configuration of a vehicle control device as a first embodiment according to the present invention. A reference numeral 1 denotes a handle (steering wheel) and a numeral 2 denotes an ECU (Electronic Control Unit) for an EPS (Electric Power Steering, that is, a motor-driven power steering device). The ECU controls an actuator 4 composed of an electric motor which directly acts on a steering rack 8 for moving the same in the lengthwise direction.

A numeral 3 designates another ECU (Electronic Control Unit) of a VGRS (Variable Gear Ratio System) which is controllable in response to an output (i.e., steering angle $\theta_H$) from a steering angle sensor 7 and so on. The ECU 3 controls another actuator 5 which acts on a steering shaft 9 for rotating the same. The ECU 3, the actuator 5 and so on of the VGRS constitutes a means for varying the steering gear ratio, i.e., the ratio of the a real steering angle to the manipulated steering angle (handle angle), at an intermediate part within the steering mechanical system in dependence upon the driving state, Japanese unexamined, published patent application No. 11-49003 (1999-49003) entitled "STEERING DEVICE FOR VEHICLES" exemplifies a VGRS of this type.

Figure 3:
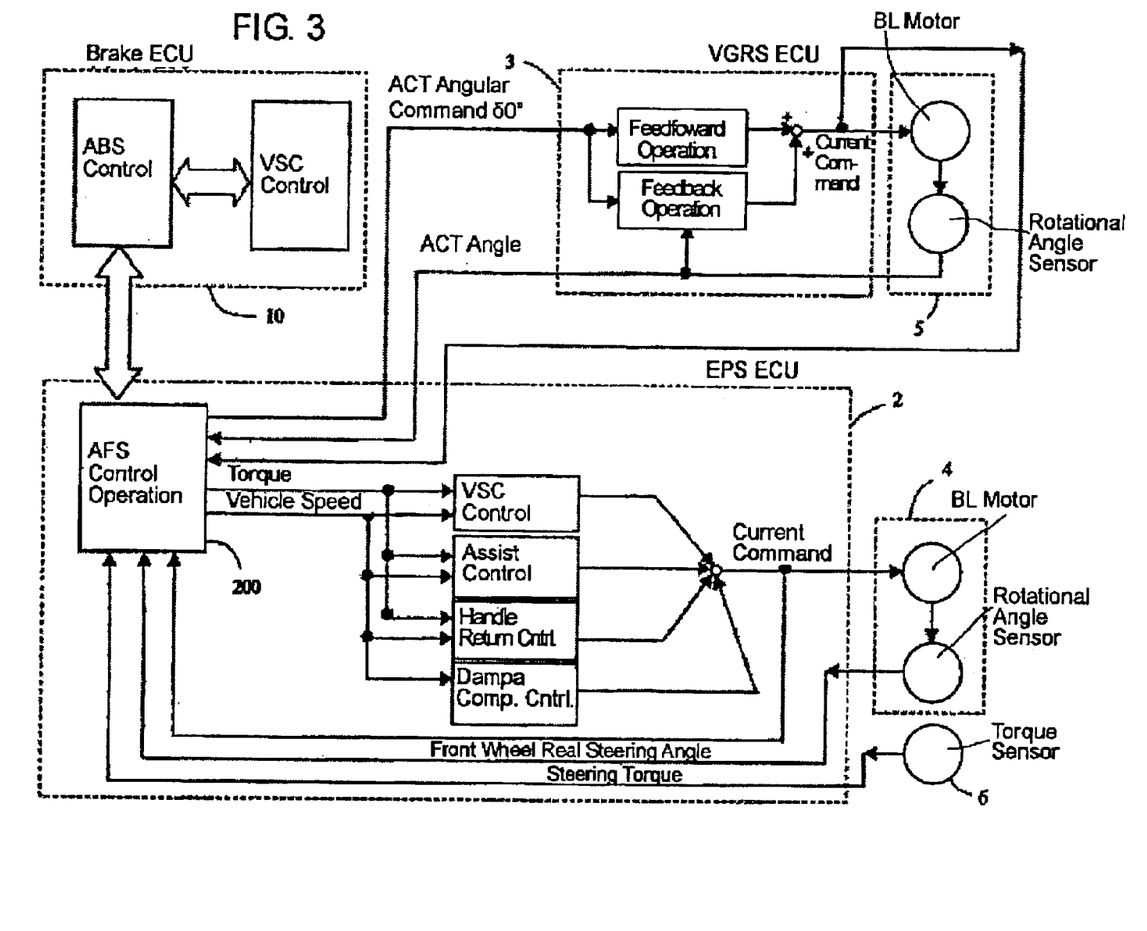
FIG. 3 is a control block diagram of the vehicle control device in the first embodiment according to the present invention.

Referring now to FIG. 3, there is shown a control block diagram of the vehicle control device constructed as the embodiment according to the present invention. An ECU 10 is provided for controlling an ABS (Anti-skid Brake System) and the related parts. The ECU 2 for the EPS is connected to the ECU 10 as well as the ECU 3 for controlling the VGRS via a CAN (Controller Area Network). These ECU 2, 10 and 3 share control data of various kind such as, for example, yaw angular velocity (r) of the vehicle, the lateral acceleration (a) of the vehicle, steering angle ($\theta_H$) of the handle, real steering angle ($\delta$) of the front wheels, vehicle speed (V), steering torque ($\tau$), side slip angle ($\alpha$) and so on.

An AFS (active-front-steer) control operation section 200 in FIG. 3 executes the administration of major programs (e.g., torque inertia compensation control, assist control, handle returning control, damping compensation control and the like) as well as calculates the value of an ACT (actuator) angle command. This command value coincides with the aforementioned compensation value ($\delta 0$) when the driver keeps a straight-ahead position (neutral position) of the handle 1.

Figure 4:
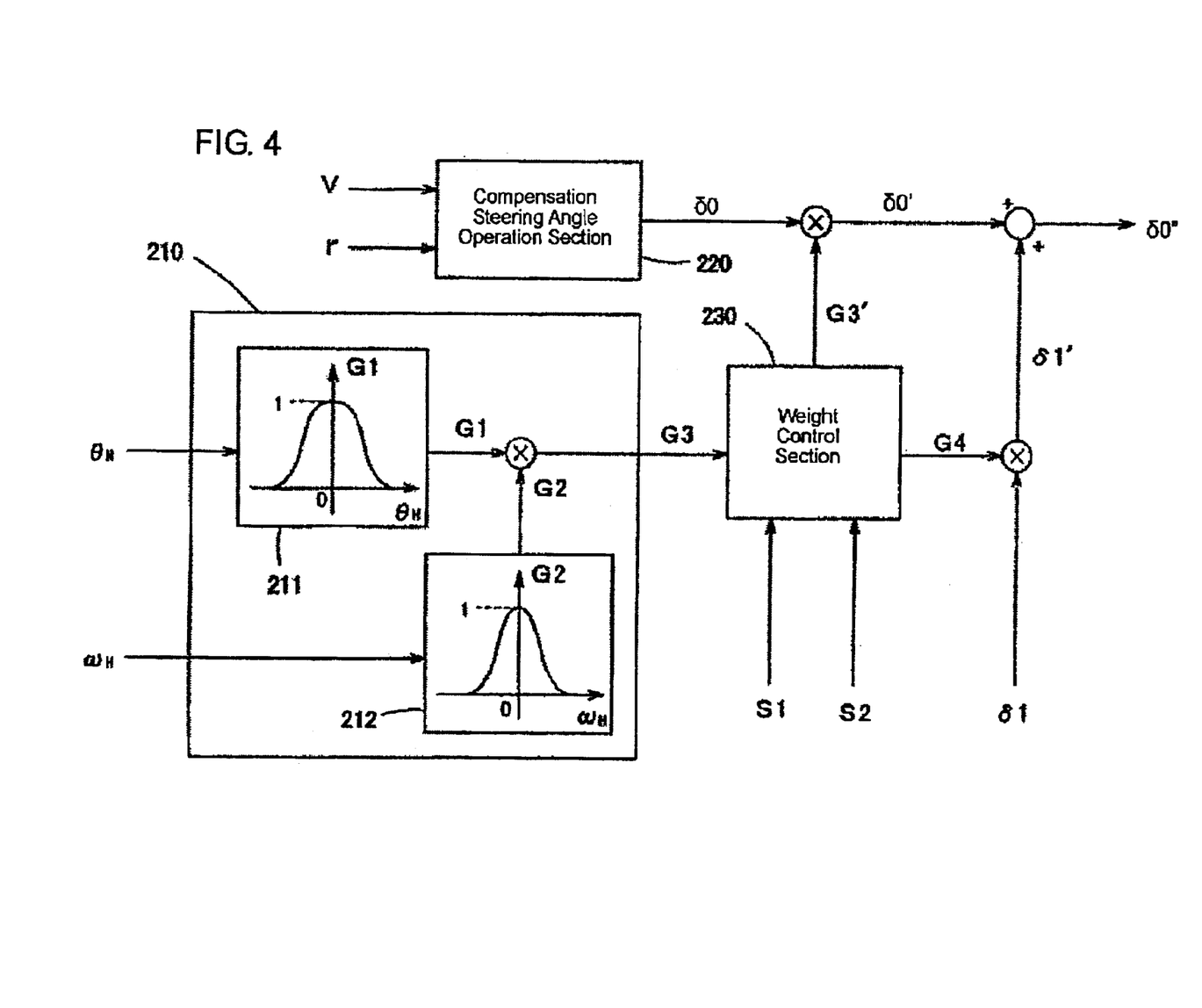
FIG. 4 is a control block diagram of a part constructed according to the first embodiment, of an AFS control operation section 200 shown in FIG. 3.

Referring then to FIG. 4, there is shown a control block diagram of a part concerned with the present invention, of the AFS control operation section 200 shown in FIG. 3. The compensation steering angle operation section 220 (compensation steering angle calculating means) calculates a compensation steering angle ($\delta 0$) based on the equation (4). A straight-ahead steering angle operation section 210 (straight-ahead steering judging means) has input thereto the steering angle ($\theta_H$) and the steering angular velocity ($\omega_H$) which is the time-differentiated value of the steering angle ($\theta_H$), and uses maps 211, 212 to calculates a weight G3 (=G1×G2). The following equations (6) and (7) represent functions (f1, f2) expressed by these maps.

$$G1 = f1(\theta_H) \tag{6}$$

$$G2 = f2(\omega_H) \tag{7}$$

Of course, these functions f1 ad f2 may be represented by equations.

These maps 211, 212 have their curves whose intercept coordinates on the vertical axis indicate Gi=1 (no dimension) and which have the smallest values at the both ends to be symmetrical with respect to the vertical axis. For example, the graphs can take the shape of any of trapezoid, rectangle, bowl, bell, normal probability curve or the like. That is, the graphs can take any of the forms having the curves which are flat on top and decrease sharply and monotonously as it goes towards each extreme ends (i.e., $\pm\infty$). The optimum shape of the graphs can be determined experimentally.

In particular, where the curves take the form of a rectangular, the use of the aforementioned maps becomes substantially unnecessary. In this case, the judgment processing executed by the straight-ahead steering judging means (the straight-ahead steering angle operation section 210) is ended in the processing for judging whether the functions (f1, f2) are larger than the absolute values of the independent variables ($\theta_H$, $\omega_H$), so that the processing therefor can be simplified.

However, since the judgment as to the straight-ahead steering position (the neutral steering position) does not necessarily have a definite criterion, it is more preferable to make such judgment in accordance with a fuzzy control theory. By introducing these control methods, it becomes possible or easy to realize a natural steering feeling having a less unpleasant feeling around the straight-ahead steering position.

Further, the vehicle speed may be added into calculating the aforementioned weight G3. More specifically, the weight G3 may be calculated in the way of such as "G3=G1×G2×f3 (V) (where: 0≦f3 (V)≦1)". By employing a suitable, monotonously increasing function as the function (f3), there can be realized a vehicle motion characteristic which maintains the straight-ahead stability rigid or stiff in a high speed range and there can be obtained a steering feeling which is almost the same as to that of the prior art device in a slow speed range.

A compensation angle ($\delta 1$) at the lower-right in FIG. 4 indicates the compensation value which is calculated in the foregoing prior control method shown in FIG. 10.

Figure 5:
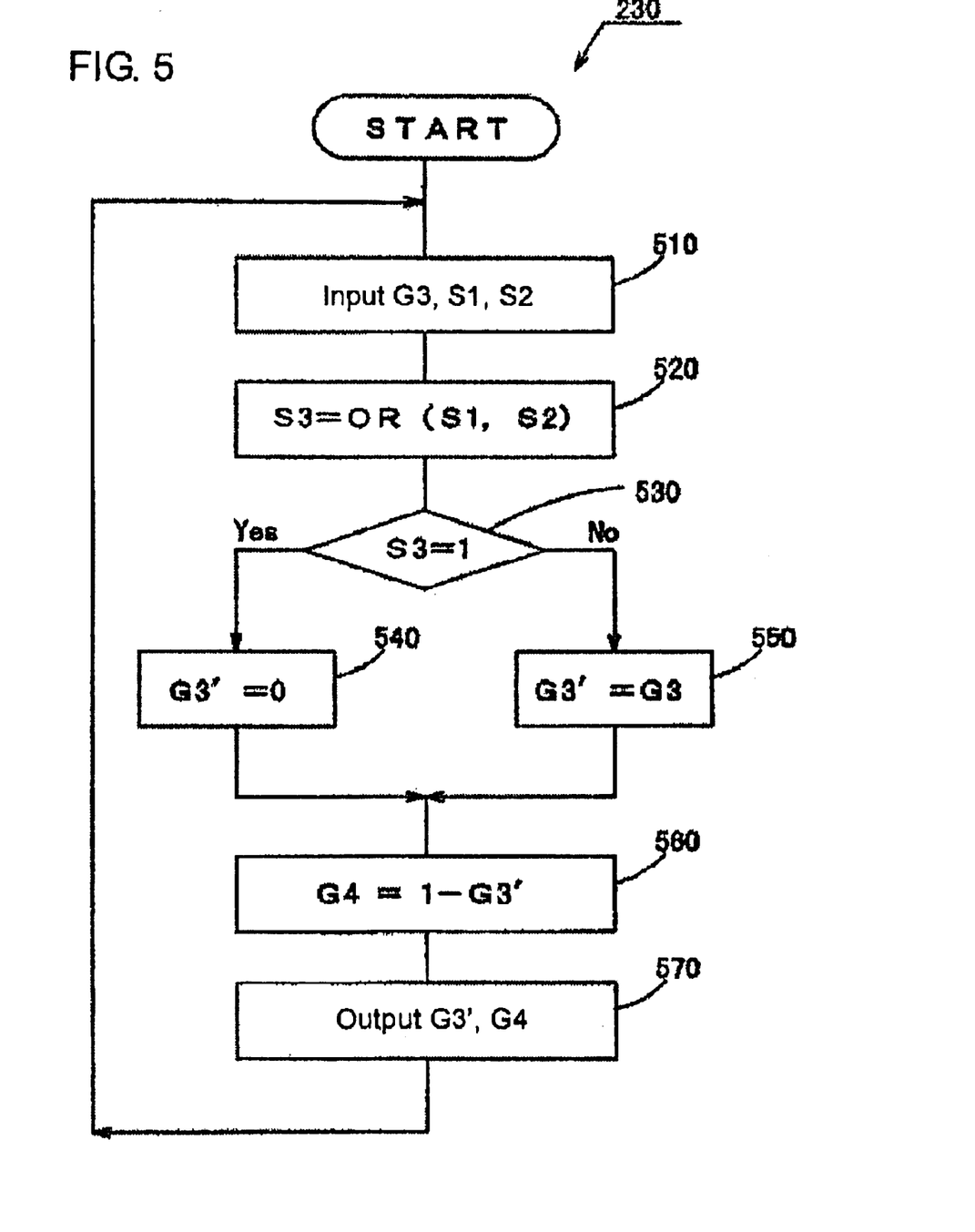
FIG. 5 is a flow chart exemplifying the execution procedure of the processing executed in a weight control section shown in FIG. 4.

FIG. 5 shows a flow chart exemplifying the control processing procedure executed by the weight control section 230 shown in FIG. 4. First of all, step 510 is executed to input thereto the weight G3 and command signals S1, S2. The fist command signal S1 is an intermediate output value of a first compensation canceling means according to the present invention, and the value is set to be S1=1 when an object detecting means according to the present invention detects an obstacle or a moving object around the vehicle, and to be S1=0 when it does not.

Similarly, the second command signal S2 is an intermediate output value of a second compensation canceling means according to the present invention, and the value is set to be S2=1 when a lane line crossing inferring means according to the present invention infers that crossing a lane line takes place and to be S2=2 when it does not.

A logical OR of the command signals S1 and S2 are obtained to be stored as a variable S3 at step 520. Steps 540, 550 and 560 respectively represent substitution statements relating to the weights G3' and G4.

For example, in accordance with the control processing execution procedure as mentioned above of the weight control section 230, the compensation values $\delta 0'$ and $\delta 1'$ are calculated as represented by the following equations (8) and (9).

$$\delta 0'=\delta 0\times(G3\times S3)$$

$$S3=(1-S1)\times(1-S2) \tag{8}$$

$$\delta 1'=\delta 1\times\{1-(G3\times S3)\} \tag{9}$$

The value of the above signal S3 usually represents "1" in other cases than such an extraordinary case that an obstacle tends to be detected around the vehicle or the same tends to cross a lane line.

Accordingly, by the operation of the straight-ahead steering angle operation section 210, the value of the following equation (10) which value is finally calculated as the a command value δ0" of the ACT angular command approximately coincides with the value δ0 of the foregoing equation (4) when the vehicle is in the state of the straight-ahead steering position (i.e., G3≈1).

$$\delta 0''=\delta 0'+\delta 1' \tag{10}$$

Furthermore, when the steering is dynamically performed like that during a cornering, the value G3 becomes approximate 0 (zero), in which case the compensation value δ1 which is calculated in the prior art method is employed.

Where a medium or transitional steering is performed like almost the neutral position steering in which the handle is shaking a little around the neutral position, the functions f1 and f2 are made preferred or optimized. As a result, a preferred value or an optimum value is set as the command value δ0" of the ACT angular command which is finally output, so that a natural steering feeling can be realized.

With the configuration described above as one example, there can be realized a vehicle motion performance which is sufficiently stable in having a stiff or rigid straight-ahead stability. According to the foregoing embodiment, the driver can therefore be relieved of performing a highly skilled or delicate steering when the vehicle is subjected to a disturbance such as lateral wind, laterally slanted road, etc.)

The foregoing embodiment has exemplified the vehicle control device of the configuration that controls the steering mechanism by the combination of the EPS (electric motor power steering) for controlling the actuator 4 including a motor which directly acts on the steering rack 8 and the VGRS (variable gear ratio system) which controls the actuator 5 including a motor acting on the steering shaft θ. However, the present invention can be practiced in power steering systems of other types. For example, a steer-by-wire-system and an electric motor power steering device of a conventional type which is presently in wide use are those in which the present invention can be practiced.

However, in the steer-by-wire-system and the system of the "EPS+VGRS" type as described above, the handle is not directly connected to tires (namely, to the real steering angle) because they take the construction that wires are used for control and drive and that the actuator for VGRS is intervened at the side of the handle rather than at the side of a torque sensor. For this reason, the freedom of the steering mechanism for transmitting the steering torque is much secured in these systems than in the prior art electric motor power steering device which is driven and controlled by one electric motor only. Therefore, the steer-by-wire-system and the system of the "EPS+VGRS" type are easy to eliminate, reduce or adjust an unpleasant feeling which is involved in the straight-ahead steering (neutral position steering).

(Modifications)

Although the foregoing first embodiment employs the equation (4) at the compensation steering angle operation section 220 shown in FIG. 4, it can employ the equation (5) instead. In this modified case, instead of the yaw angular velocity (r), a lateral acceleration (a) acting on the vehicle body is input to the vehicle control device or is calculated by the following equation (11).

$$a=Vr \tag{11}$$

Where an alarm means according to the present invention is to be used in the construction shown in FIG. 4, an arrangement may be made to output an alarm message in the case of "δ0≧ϵ1" or "δ0'≧ϵ2" or "δ0"≧ϵ3". Here, ϵ1, ϵ2 and ϵ3 are predetermined constants. According to the alarm means like this, the driver is notified of when a not-a-small disturbance occurs, or the outputting of the alarm message is cancelled when a relatively small disturbance is being generated.

Although it does not matter to think that the stability factor (constant A) of the equation (3) does not almost vary, the stability factor (a) varies with the change in the vehicle weight or in the position of the gravity center. That is, the stability factor (A) varies with the number of passengers, the load capacity, the accessories equipped and the like. To cope with these variations, it is effective to provide a weight meter on each vehicle, each axle and each road wheel. By doing so, the variation in the total weight and the gravity center of the vehicle can be precisely calculated, so that the accuracy of the stability factor (A) can be largely improved on a real time basis. Therefore, it becomes possible to calculate the compensation steering angle δ0 more accurately by the use of the foregoing equation (4) or (5).

(Second Embodiment)

Prior to describing a second embodiment in detail, the general concept thereof is described for better understanding. Specifically, the second embodiment in one or first preferred form is directed to a vehicle control device having a power steering device for imparting an assist torque or a steering command to a steering mechanism of the vehicle. The control device further comprises compensation steering angle calculating means for calculating a compensation steering angle (δ0) relative to a real steering angle of the steering mechanism by using feedback control means for feeding back a yaw angular velocity (r) of the vehicle or the time-integral of the same; extraordinary yaw motion detecting means for detecting an extraordinary yaw motion which occurs with the vehicle being braked on an asymmetrical surface road having an asymmetrical surface state; and control mode altering means for dynamically altering the control mode of the feedback control means or control parameters used therein, wherein the real steering angle is controlled by the power steering device using the compensation steering angle (δ0).

For example, means capable of detecting the following various states could be satisfactorily used as the extraordinary yaw motion detecting means.

(a) The state in which brake forces on the right and left tires have a large difference.

(b) The state in which the difference (Δr) of the foregoing equation (1) is becoming relatively large.

For example, the state of (b) is able to be detected by a means for judging a large/small relation of the value of the difference ($\Delta r \equiv r_n-r$) in comparison with a suitable predetermined threshold value. A means for detecting the state of (a) will be exemplified with a concrete form in the embodiment described later.

By employing these extraordinary yaw motion detecting means, a proportional integral control (I.e., PI control) is executed only when the yaw motion is large or is becoming large, that is, only when the need therefor is high. Thus, a temporal countermeasure such as dynamically altering the control mode or the control parameters used is constituted depending upon the detection result of the extraordinary yaw motion. As a result, there can be avoided a situation that an unpleasant feeling accompanied by vibration or a strange feeling is given to the driver in the usual state, and the yawing of the vehicle can be effectively suppressed in the event that brake is applied to the vehicle on the asymmetrical surface road, whereby the braking operation on the asymmetrical surface road or the like can be effectively stabilized.

For example, by the foregoing operation, the yawing of the vehicle can be decreased more effectively than in the prior art device even when an emergency braking is applied with the handle being hold in the neutral position. Further, the turning motion of the vehicle to move away from the direction in which the vehicle is to travel can be relieved of more effectively then in the prior art device.

With the foregoing configuration and operation, the driver is relived of a high lever or delicate steering skill needed to him or her and is enabled to secure the stability of the vehicle thanks to a smoother steering.

Further, in the foregoing control mode altering means, the control parameters important in calculating the compensation steering angle ($\delta\theta$) may be dynamically altered. The examples of the control parameters may be the gain given to the proportional member ($\Delta r = r_n - r$) of the aforementioned equation (1), the gain given to the integral term, or other gains. By altering the gains to suitable real values ($\geq 0$) not including zero or less from time to time, there can be constituted a temporal countermeasure which is almost equivalent to the aforementioned temporal countermeasure.

In addition, those systems to which the second embodiment is applicable could, for example, be a steer-by-wire system, a hybrid system combing an EPS with a VGRS as exemplified later, a conventional electric motor power steering system of a single motor type, and so forth. In particular, in the viewpoint that a power steering device with a more natural steering feeling can be easily constituted, the steer-by-wire system and the hybrid system combing the EPS with the VGRS are more favorable as the system to be selected.

This is because the canceling, lowering and adjusting (tuning) of a strange feeling in the state of neutral position steering can be relatively easily carried out in the steer-by-wire system and the hybrid system, wherein the steering angle is not directly connected with the real steering angle (i.e., there is not a one-to-one relation), rather than in the conventional electric motor power steering system which is driven and controlled by one electric motor only.

In another or second preferred form, the feature of the second embodiment resides in providing the control mode altering means in the first preferred form with proportional control temporarily expanding means for altering the control mode from a proportional control mode to a PI control mode (proportional integral control mode) by giving a trigger to the foregoing time-integral operation processing when the extraordinary yaw motion is detected.

That is, with this configuration, for example, the aforementioned control mode altering means can be constituted concretely and effectively.

In still another or third preferred form, the feature of the second embodiment resides in further providing, in the first or second preferred form, control mode restoring means for restoring the control mode or the control parameters altered dynamically by the control mode altering means, to the original control mode or parameters when the motion parameters influencing the magnitude of the extraordinary yaw motion such as the vehicle speed (V), the lateral acceleration (a) or the like are attenuated below a predetermined reference value.

With this means, after an unfavorable action of the vehicle such as yawing motion is weakened to a certain level, the control mode for the vehicle is restored to the conventional proportional control mode using the foregoing equation (1). Thus, in the normal state after the unfavorable action is so weakened, the situation that the driver is given an unpleasant steering accompanied by vibration or a strange feeling can be prevented from coming to reality or being actualized.

In a further or fourth preferred form, the second embodiment features providing the extraordinary yaw motion detecting means in any of the first to fourth preferred forms with brake force difference calculating means for calculating the difference ($\Delta F$) between brake forces acting on the right and left wheels of the vehicle, and on-asymmetrical surface road brake detecting means for detecting the braking operation on an asymmetrical surface road by judging whether or not the absolute value ($|\Delta F|$) of the difference ($\Delta F$) has reached a predetermined threshold value.

With these means, the braking operation on the asymmetrical surface road having an asymmetrical surface state can be detected precisely, so that the necessity of a countermeasure such as the aforementioned proportional integral control mode (PI control mode) or the like can be judged in a reliable manner.

In an additional or fifth preferred form, the feature of the second embodiment is directed to the brake force difference calculating means in the fourth preferred form, wherein the difference ($\Delta F$) is calculated on the basis of oil pressures in wheel cylinders for the right and left wheels and angular accelerations of the right and left wheels.

The brake force difference calculating means will be described in detail in the following second embodiment. With this means, for example, the foregoing brake force difference calculating means can be constituted in a relatively easy and precise manner.

Next, the second embodiment of the present invention will be described with reference to FIGS. 6 through 8. The same configurations as those illustrated in FIGS. 1 to 3 are employed in this second embodiment. The vehicle control device as shown in FIG. 3 is also used in the second embodiment according to the present invention. The ECU 10 in FIG. 3 is provided for controlling the ASS (Anti-skid Brake System) and the related parts. The ECU 2 for the EPS is connected to the ECU 10 as well as the ECU 3 for controlling the VGRS via the CAN (Controller Area Network). These ECU 2, 10 and 3 share control data of various kind such as, for example, yaw angular velocity (r) of the vehicle, the lateral acceleration (a) of the vehicle, rotational angular velocities $\omega i$ (i=1, 2, 3, 4) of wheels, rotational angular accelerations $\alpha i$ (i=1, 2, 3, 4) of the wheels, oil pressures Pi (i=1, 2, 3, 4) of the wheels, real steering angles ($\delta$) of the front wheels, steering angle ($\theta_H$) of the handle, vehicle speed (V), steering torque ($\tau$), side slip angle ($\phi$) and so on.

Figure 6:
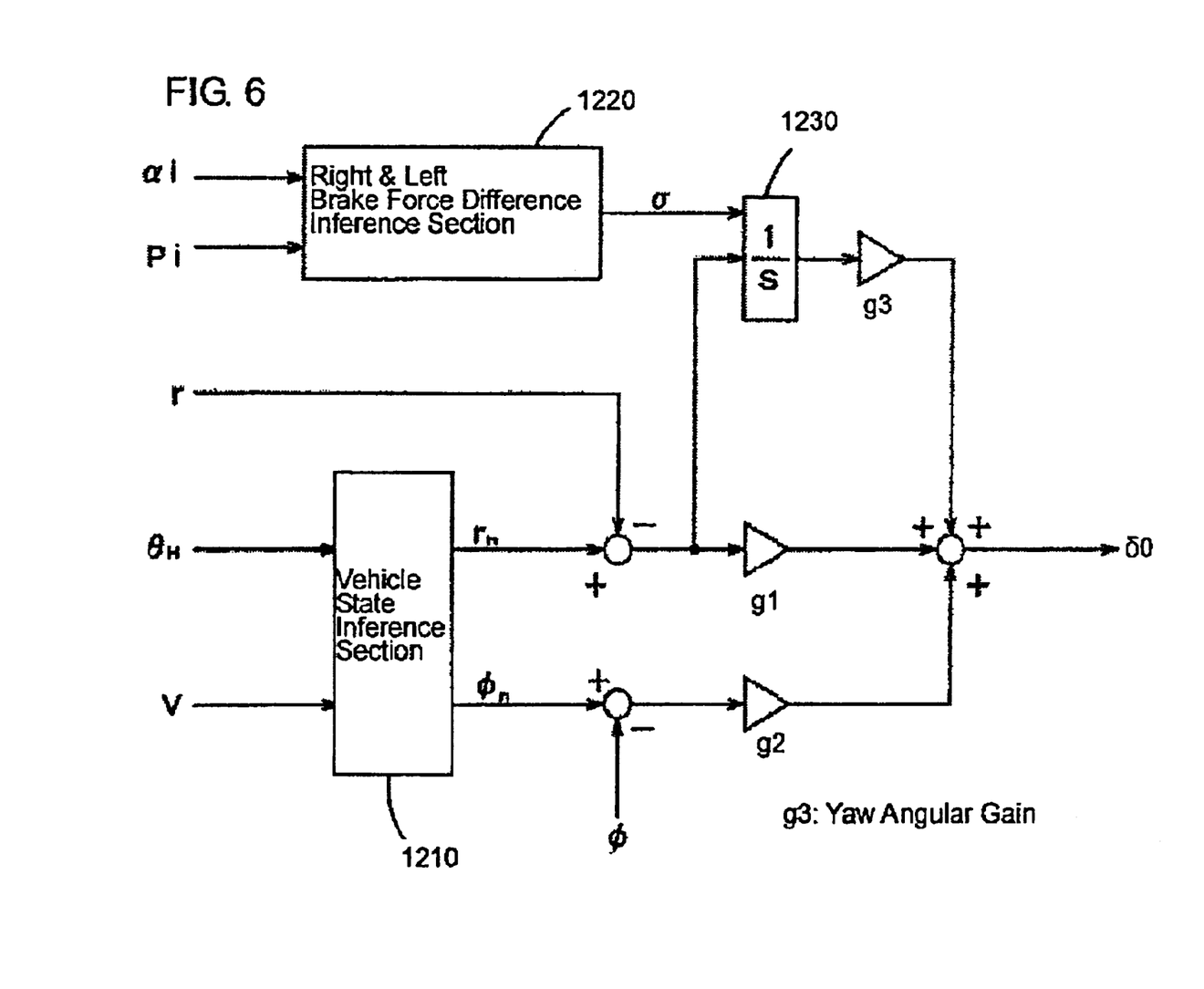
FIG. 6 is a block diagram of a part constructed according to a second embodiment, of the AFS control operation section 200 shown in FIG. 3.

FIG. 6 shows a control block diagram of a part concerning the second embodiment, of the AFS control operation section 200. A vehicle state inference section 1210 infers a target value ($r_n$) of the vehicle yaw angular velocity (r) and a target value ($\phi n$) of the vehicle side slip angle ($\phi$). The vehicle yaw angular velocity (r) and the vehicle side slip angle ($\phi$) are measured separately. Usually, the aforementioned ACT command angle ($\delta$) is calculated based on the foregoing equation (1).

In the second embodiment, the extraordinary yaw motion detecting means is realized by a right-left brake force difference inference section 1220 shown in FIG. 6. A command signal (σ) is indicative of a trigger signal for initiating a time-integral action. A time-integral operation section 1230 executes a time-integral action (definite integral) of the difference (Δr) ($\equiv r_n - r$) for the time period of (σ=1). That is, the command signal (σ) is indicative of a trigger signal to initiate the time-integral, so that the time-integral is initiated from the time when the value of the signal (σ) is switched from "0" to "1". The symbol "1/S" of the time-integral operation section 1230 represents the time-integral processing.

The operation of the right-left brake force inference section 1220 will be described hereinafter.

Now taking as F1 the brake force acting on a front left wheel (tire) of the vehicle, the following dynamic equation (12) which represents a rotational motion model for rotational motion of each wheel is materialized, so that the brake force F1 can be obtained by the following equation (13). Likewise, the brake force F2 of the front-right wheel can be obtained in the same manner as above.

$$J\alpha i = \gamma Fi - \kappa Pi (i=1, 2) \quad (12)$$

$$Fi = (J\alpha i + \kappa Pi)/\gamma (i=1, 2) \quad (13)$$

(Notation of Symbols)

α1: angular velocity of front-left wheel
α2: angular velocity of front-right wheel
P1: oil pressure in wheel cylinder for front-left wheel
P2: oil pressure in wheel cylinder for front-right wheel
F1: brake force acting on front-left wheel (tire)
F2: brake force acting on front-right wheel (tire)
J: wheel inertia
γ: radius of front wheels (tires)
κ: coefficient of conversion Consequently, by detecting the values of αi (i=1, 2) and Pi (i=1, 2) on a real time basis, the brake forces Fi which act on the respective wheels can be inferred at any time on the real time basis.

Figure 7:
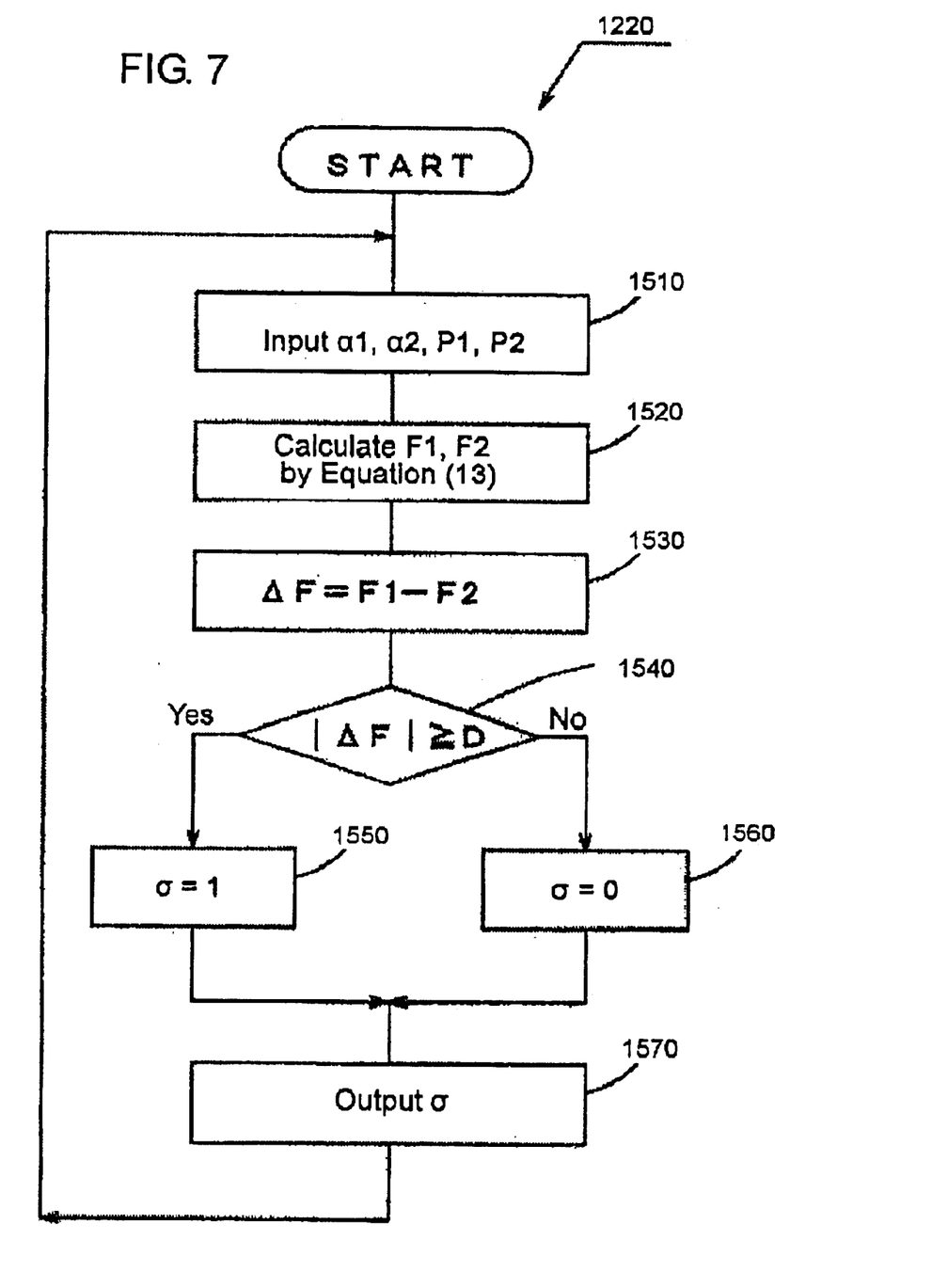
FIG. 7 is a flow chart exemplifying the execution procedure of a right-left brake force difference inference section 1220 shown in FIG. 6.

FIG. 7 shows a flow chart exemplifying the execution procedure of control processing in the right-left brake force difference inference section 1220. In this algorithm, first of all, the values αi (i=1, 2) and Pi (i=1, 2) are input at step 1510. These values are input from the ABS control section shown in FIG. 3.

At step 1520, the brake forces F1, F2 are calculated by the aforementioned equation (13). Step 1530 follows to calculate the difference ΔF (=F1−F2) between the brake forces F1, F2 being applied on the front right and left wheels, and step 1540 further follows to judge which of a predetermined threshold value (D) and the brake force difference ΔF a larger one is. The threshold value (D) may be determined in dependent on the accuracy in measuring the vehicle yaw angular velocity (r=a/V) or the vehicle lateral acceleration (a=Vr) as well as the accuracy in inferring the target value ($r_n$) or the like. Where the measuring accuracy and the inferring accuracy are improved as high as possible, it becomes possible to make the threshold value approximate as much as possible to the maximum value of the absolute value of an error inferred on the brake force difference ΔF.

Steps 1550 and 1560 execute the processing for substitution statements concerning the aforementioned command signal (a), and the value (1 or 0) set at either of the steps is output to the time-integral operation section 1230 shown in FIG. 6. As a result, for example, when a large difference takes place between the right and left brake forces due to the road having an asymmetrical surface state or for other reasons, the proportional control on the yaw angle velocity (r) is switched over to the PI control (proportional integral control).

Figure 8:
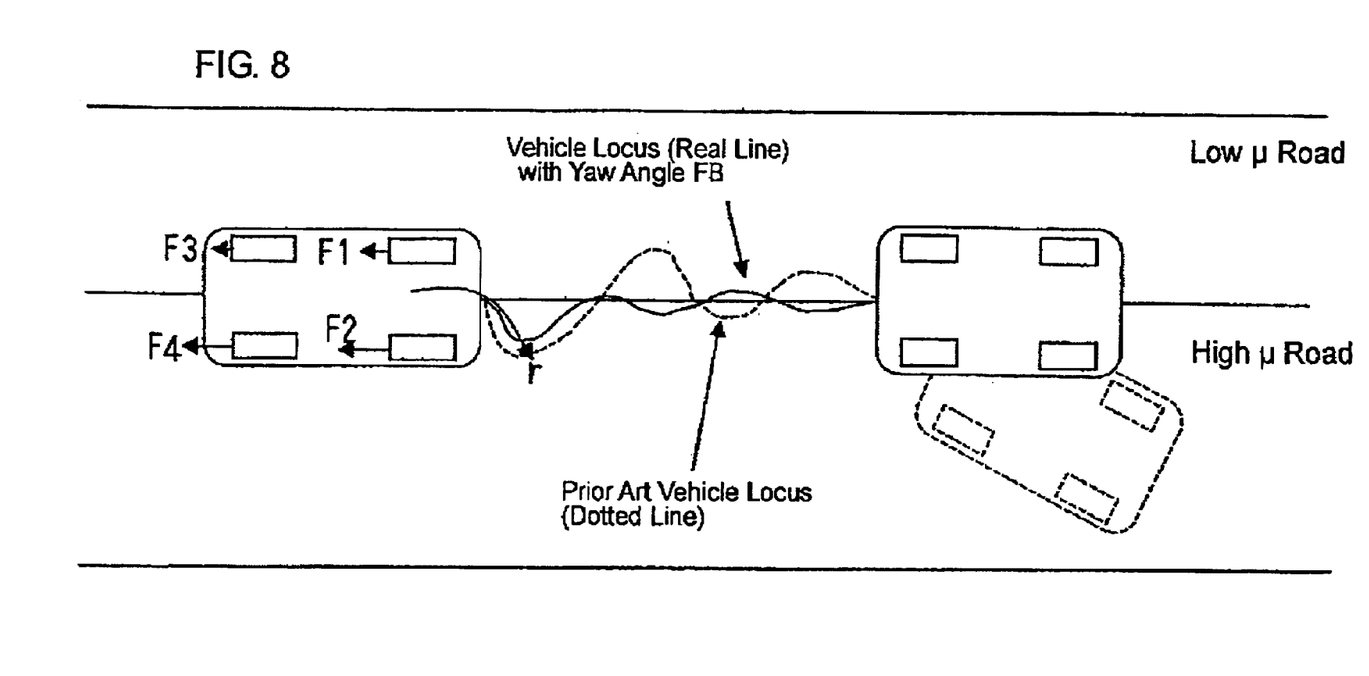
FIG. 8 is a schematic plan view demonstrating the effect achieved by the second embodiment according to the present invention.

FIG. 8 is an explanatory view schematically exemplifying the effects of the second embodiment. In this schematic illustration, the load is shown having two surface states, wherein the left part on which the coefficient (μ) of the friction the tire makes when the vehicle is braked is smaller is called a "low μ road", while the other right part having a larger friction coefficient is called a "high μ road". In an asymmetrical surface road like this, the vehicle under the control of a prior art proportional control shown in FIG. 10 behaved or acted to take a long time to converge as indicated by the dotted line in FIG. 8 and played an unstable motion characteristic.

On the other hand, with the construction shown in FIGS. 6 and 7 according to the second embodiment, as demonstrated by the real line in FIG. 8, the vehicle yawing motion was able to be suppressed satisfactorily. That is, our experiment demonstrated that the control device according to the second embodiment could perform a vehicle motion characteristic which is not only stable but also excellent in a capability of convergence.

(Modifications for Second Embodiment)

Although the foregoing second embodiment provides means for suppressing the vehicle yawing motion by the action of the compensation steering angle (δθ), this compensation can be executed together with the compensation processing of the vehicle yaw angular velocity which the ABS can execute when brake is applied. More specifically, it is known that means for generating a counter (in opposite direction) yaw angle velocity signal to cancel an unfavorable yaw motion can be realized by, for example, a VSC control (Vehicle Stability Control) which is carried out by the brake control ECU 10 shown in FIG. 3. Accordingly, there can be employed a hybrid system which additionally utilizes such a means for generating the counter yaw angular velocity signal and in which the AFS control operation section 200 and the VSC control section shown in FIG. 3 operates in cooperation.

Further, although in the aforementioned second embodiment, the difference ΔF between the right and left brake forces is inferred based on those from the front-right and front-left wheels, the inference of such brake force difference can be replaced by a calculation which uses the state variables αi (i 1, 2, . . . ) and Pi (i=1, 2 . . . ) of all wheels (usually, four wheels) of the vehicle. According to the method like this, it may be the case that the difference ΔF between the right and left brake forces can be inferred more accurately.

The foregoing second embodiment has exemplified a vehicle control device of the configuration wherein the assist control of the steering mechanism can be realized by the combination of the EPS (electric motor power steering device) for controlling the actuator 4 having the motor directly acting on the steering rack 8 and the VGRS (variable gear ratio system) for controlling the actuator 5 acting on the steering shaft 9. However, there may be used other systems to which present invention is applicable. For example, the present invention can be applicable to the vehicle which incorporates a steer-by-wire-system, a conventional electric power steering system of the prior art type (i.e., single-motor type EPS) which has been presently in wide use, or the like.

(Third Embodiment)

Figure 9:
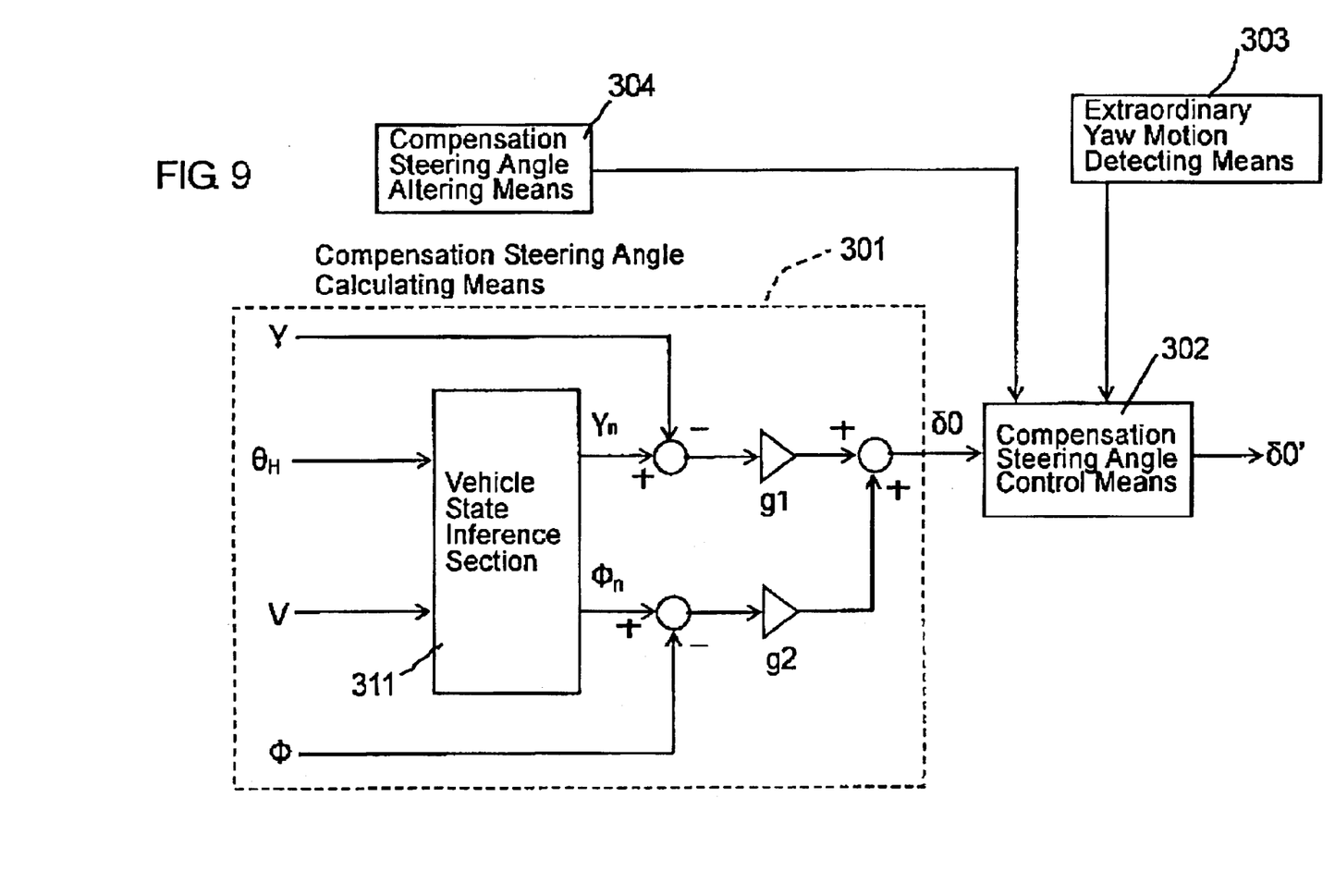
FIG. 9 is a control block diagram of a part constructed according to a third embodiment, of the AFS control operation section 200 shown in FIG. 3.

A third embodiment is directed to a vehicle control device which embodies the general inventive concept of the present invention. FIG. 9 shows a block diagram exemplifying the important part of the vehicle control device which constitutes the third embodiment according to the present invention. Referring now to FIG. 9, there is shown a control logic which is replaced by that shown in FIG. 4 of the first embodiment or shown in FIG. 6 of the second embodiment. The control logic comprises a compensation steering angle calculating means 301, a compensation steering angle control means 302, an extraordinary yaw motion detecting means 303 and a compensation steering angle altering means 304.

The compensation steering angle calculating means 301 is of the same configuration as the prior art shown in FIG. 10. This means 301 includes a vehicle state inference section 311 and infers the running state of the vehicle based on a steering angle ($\theta_H$) and a vehicle speed (V) input thereto and generates a target yaw angular velocity ($\gamma_n$) and a target side slip angle ($\phi_n$) from the inferred vehicle running state. Then, the means 301 calculates a compensation steering angle ($\delta 0$) based on a detected yaw angle velocity ($\gamma$), a detected side slip angle ($\phi$), the inferred, target yaw angle velocity ($\gamma n$) and the inferred, target side slip angle ($\phi_n$), as previously described with reference to FIG. 10.

In the particular third embodiment, the compensation steering angle control means 302 processes the compensation steering angle ($\delta 0$) so calculated in response to the extraordinary yaw motion detecting means 303 and a compensation steering angle altering means 304. To be more exact, the compensation steering angle calculating means 301 passes the compensation steering angle ($\delta 0$) as it is, so that the substantially same control operation as to the prior art is performed.

However, when the occurrence of an extraordinary yaw motion is detected by the extraordinary yaw motion detecting means 303, the control means 302 responds to a signal from the compensation steering angle altering means 304. One example of the countermeasures in such event is to generate a counter (opposite direction) yaw angle by the equation (4) or (5) as previously described, whereby the extraordinary yaw motion can be suppressed or moderated by the counter yaw motion. That is, as described previously, the compensation steering angle operation section 220 has a function to detect the extraordinary yaw motion as disturbance and another function to generate the counter yaw motion signal. In FIG. 9 representing the third embodiment, those for realizing these functions of the compensation steering angle operation section 220 are embodied as the extraordinary yaw motion detecting means 303 and the compensation steering angle altering means 304, respectively.

Another example of the countermeasures taken in the event of an extraordinary yaw motion occurring is to switch over the control mode from a proportional control to a time-integral control as described previously in connection with the second embodiment, whereby the yaw motion of the vehicle can be satisfactorily suppressed to converge within a short time period. The switching-over function is realized by the time-integral operation section 1230 shown in FIG. 6.

In addition, the compensation steering angle altering means 304 can be realized in other forms. One form thereof may be to lower the responsibility of the compensation steering angle control means 302, so that the steering character can be made rigid or stiff during the occurrence of the extraordinary yaw motion.

Obviously, numerous modifications and variations of the present invention are possible in light of the above teach-ings. It is therefore to be understood that within the scope of the appended claims, the present invention may be practiced otherwise than as specifically described herein.

What is claimed to be secured by the Letters Patent of the United States is:

1. A vehicle control device including a power steering device which provides an assist torque or a steering angle command to a steering mechanism of a vehicle, the control device comprising:

compensation steering angle operation means for calculating a compensation steering angle relative to a real steering angle of the steering mechanism;

extraordinary yaw motion detecting means for detecting the occurrence of an extraordinary yaw motion which is not caused by the steering manipulation of the driver;

compensation steering angle altering means for altering the compensation steering angle to suppress or moderate the extraordinary yaw motion; and real steering angle control means for controlling the compensation steering angle by using the compensation steering angle altering means when the occurrence of the extraordinary yaw motion is detected by the extraordinary yaw motion detecting means.

2. A vehicle control device as recited in claim 1, wherein the extraordinary yaw motion detecting means includes straight-ahead steering judging means for judging whether of not the driver is steering the vehicle to travel straight ahead, and wherein the extraordinary yaw motion detecting means detects the occurrence of the extraordinary yaw motion not caused by the steering manipulation of the driver when he or she is manipulating the straight-ahead steering.

3. A vehicle control device as recited in claim 1, further comprising:

object detecting means for detecting an obstacle or a moving object existing around the vehicle; and first compensation canceling means for canceling the compensation operation by either causing the compensation steering angle operation means not to operate or making the compensation steering angle zero when the obstacle or the moving object is detected by object detecting means.

4. A vehicle control device as recited in claim 1, further comprising:

a lane line identifying means for identifying a lane line of a traveling lane by an image processing technology;

lane line crossing inferring means for inferring whether or not the vehicle crosses the lane line; by reference to the compensation steering angle; and second compensation canceling means for canceling the compensation operation by either causing the compensation steering angle operation means not to operate or making the compensation steering angle zero when the occurrence of crossing the lane line is inferred.

5. A vehicle control device as recited in claim 1, further comprising:

alarm mean for outputting a message alarming the operator when the absolute value of the compensation steering angle or a value relating to the absolute value exceeds a predetermined threshold value.

6. A vehicle control device as recited in claim 1, wherein the extraordinary yaw motion detecting means detects the extraordinary yaw motion occurring when the vehicle is braked on an asymmetrical surface road which is asymmetrical with respect to the right and left surface states thereof.

7. A vehicle control device as recited in claim 6, wherein the compensation steering angle operation means includes feedback control means for performing a feedback control with respect to a yaw angular velocity of the vehicle or a time-integrated value thereof, and wherein the compensation steering angle altering means includes a control mode altering means for dynamically altering the control mode of the feedback control means or control parameters used by the same.

8. A vehicle control device as recited in claim 6, wherein the compensation steering angle altering means executes a proportional-integral control.

9. A vehicle control device as recited in claim 7, wherein the control method altering means is provided with a proportional control temporally expanding means for altering the control mode from a proportional control to a proportional-integral control by giving a trigger to the operation processing for the time-integration when the occurrence of the extraordinary yaw motion is detected.

10. A vehicle control device as recited in claim 7, further comprising control mode restoring means for restoring the control mode or the control parameters having been dynamically altered by the control mode altering means, to the original thereof when a motion parameter such as vehicle speed, lateral acceleration, or the like of the vehicle which parameter defines the magnitude of the extraordinary yaw motion is attenuated below a predetermined reference value.

11. A vehicle control device as recited in claim 6, wherein the extraordinary yaw motion detecting means comprises:
 brake force difference calculating means for calculating the difference between brake forces acting on right and left wheels of the vehicle; and
 asymmetrical road braking detecting means for detecting the occurrence of braking applied to the vehicle on the asymmetrical surface road by judging whether or not the absolute value of the difference has exceeded a predetermined threshold value.

12. A vehicle control device as recited in claim 11, wherein the brake force difference calculating means calculates the difference based on hydraulic pressures generated in wheel cylinders for the right and left wheels and angular velocities of the right and left wheels.

* * * * *